April 19, 1938.  W. H. GILLE  2,114,961
ELECTROMAGNETIC VALVE
Filed Aug. 20, 1934
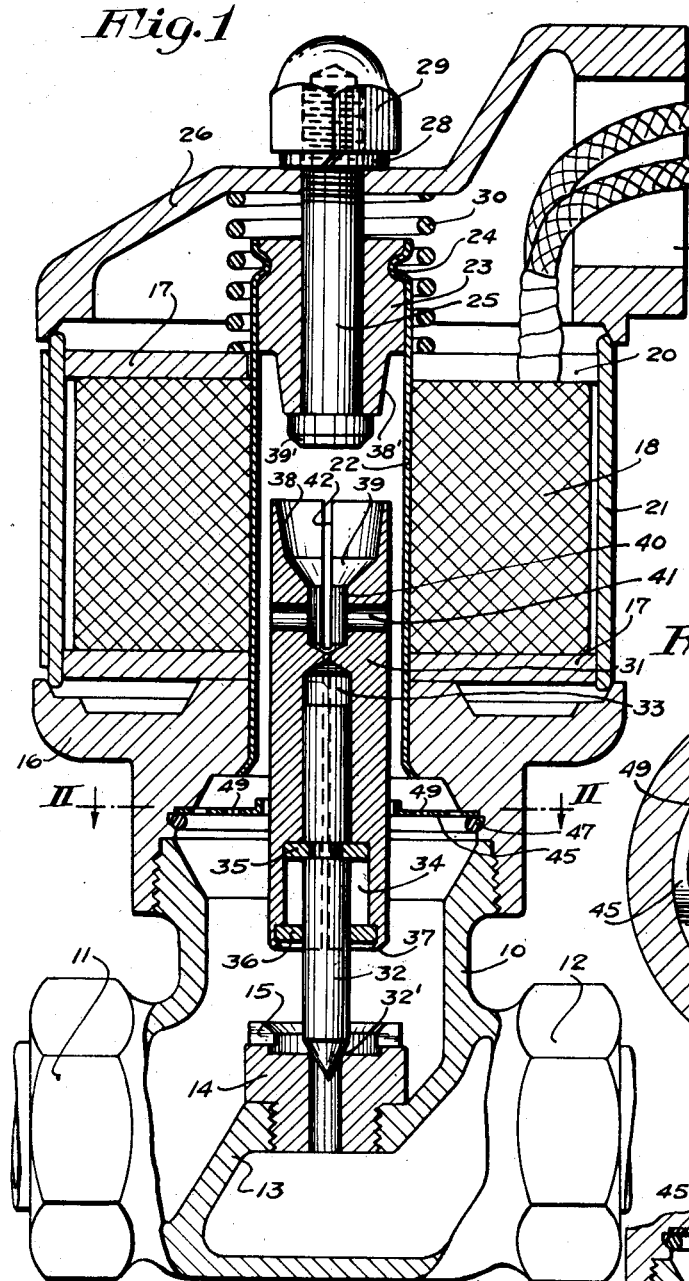
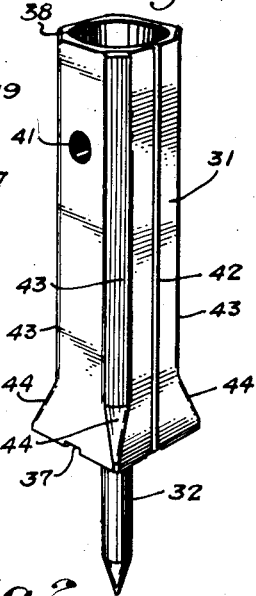
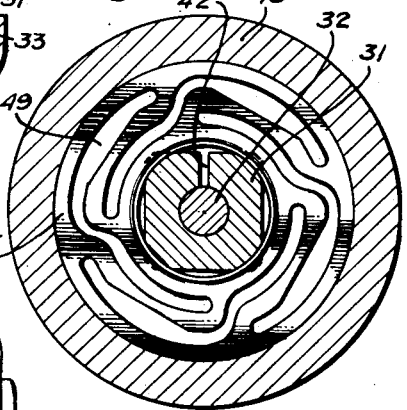
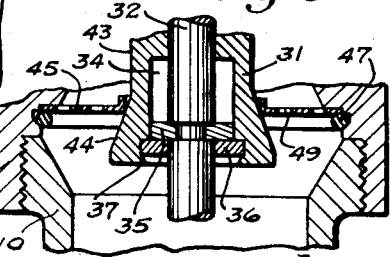
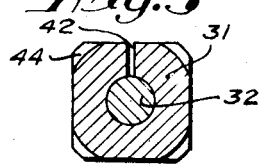
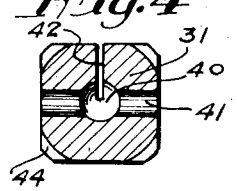
Inventor
WILLIS H. GILLE
By his Attorney
George H. Fisher Patented Apr. 19, 1938

2,114,961

UNITED STATES PATENT OFFICE 2,114,961

ELECTROMAGNETIC VALVE

Willis H. Gille, St. Paul, Minn., assignor to Minneapolis-Honeywell Regulator Company, Minneapolis, Minn., a corporation of Delaware Application August 20, 1934, Serial No. 740,547

23 Claims. (Cl. 137—139)

This invention relates to A. C. solenoids or electromagnets in general and their specific application to valves.

An object of this invention is to prevent sticking of the valve, to facilitate opening of the valve against high pressures, and to maintain a tight seat which may be accomplished by providing a lost-motion between the solenoid core and the valve stem which gives an effective hammer action to the valve.

A further object of the invention is to provide means for cooling the coil and core by providing a clearance therebetween to permit circulation of fluid between said coil and core to absorb and carry away heat generated in the electromagnet.

A further object is to prevent vibrations and humming in A. C. solenoids or electromagnets by providing a means for centering and tightly holding the core when the coil is energized.

A further object is to prevent sticking of the core when operated against positive stops by the provision of a tensioning means that becomes effective when the coil is energized.

Further objects will be apparent from the description, drawing, and claims forming a part of this specification to which reference may now be had for a more complete understanding of the characteristic features of this invention, in which drawing:

Fig. 1 is a vertical section through the valve and solenoid;

Fig. 2 is a section on the line II—II of Fig. 1;

Fig. 3 is a perspective view of the plunger assembly;

Fig. 4 is a sectional view through the plunger near the upper portion thereof;

Fig. 5 is a sectional view through the plunger midway thereof; and

Fig. 6 is a partial vertical sectional view similar to that of Fig. 1, but taken at an angle thereto, showing the parts in a different position.

The valve body or casing is generally designated at 10 and has an inlet connection 11 and an outlet connection 12. The valve body or casing 10 also has a transverse wall 13 which separates the inlet 11 and outlet 12 and is provided with an opening therein in which a removable seat 14 is screw-threaded. The valve seat 14 is provided with notches 15 to facilitate its threading into and out of the transverse wall 13.

Screw-threaded on the upper portion of the valve casing 10 is a solenoid supporting member 16. Mounted above the supporting member 16 is an A. C. electromagnetic coil 18, and above and below said coil 18 are steel plates or washers 17.

Lead wires 19 extend upwardly from the A. C. coil 18. The upper plate 17 is slotted as at 20 to accommodate the lead wires. The lower plate 17 is also preferably provided with a similar slot so that the two plates are exactly alike whereby to reduce the number of different parts required. Surrounding the coil 18 and the plates 17 is a casing member 21.

Located inside of the coil 18 is a non-magnetic conducting tube 22 which is secured and sealed to the supporting member 16 in any suitable manner. The upper end of this tube 22 is sealed closed by means of a non-magnetic conducting plug 23 being secured to the tube as shown at 24. Extending through the plug 23 is a magnetic plunger or core stop pin 25 which is integrally secured to the non-magnetic conducting plug. 26 designates a conduit cover made of non-magnetic material and 27 a conduit opening therein to accommodate the lead wires 19. 30 is a spring for securing the discs 17 and coil 18 against the solenoid supporting member 16. 28 is a lock washer, and 29 is a nut screw-threaded on the stop pin 25. By means of this construction the various parts of the solenoid or electromagnet are secured in their proper relative positions.

It will be noted at this point that the non-magnetic conducting plug 23 and the magnetic stop pin 25 have a dual function—that of sealing the tube 22 which is open to the fluid passage in the valve 10 for cooling the coil 18 and core or plunger 31, and that of centering and tightly holding the plunger 31 when the coil is energized—as will be more fully pointed out hereafter.

The solenoid plunger or core 31 is loosely mounted in the tube 22 so that fluid from the valve may circulate therearound for the purpose of cooling. The core has a bore 33 which receives the valve stem 32. A lost-motion connection is provided between the valve stem 32 and the core 31 by means of an enlarged bore 34 in the core, a collar 35 in the form of a split ring secured on the valve stem, and an abutment member 36 crimped on the plunger as shown at 37. The valve stem is tapered at the lower ends thereof to form a valve portion 32' to coact with the valve seat 14. This construction forms a hammer action to insure a tight seating of the valve, to facilitate opening of the valve against high pressures, and to prevent sticking of the valve, as will be pointed out more fully hereafter.

The upper end of the core is hollowed out as at 38 to correspond with the tapered projection 38' of the plug member 23 to guide the core or plunger in its upward movement. The core or plunger also has a tapered counter-bore 39 which corresponds to the taper 39' of the stop pin 25. It is found that a 45° taper is most beneficial in this construction. Extending downwardly from this tapered counter-bore is another bore 40 which is connected to transverse bores 41. 42 is a longitudinal slot extending throughout the length of the plunger 31 and communicating with the bores 38, 39, 40, 33, and 34. The hollow portions of the core coact with the projections of the plug and stop pin to form a centering and substantially constant holding means for the core when the coil is energized, as will be pointed out more fully hereafter. The slot 42 has a dual function—that of preventing a dash-pot action at the upper end of the core because of its relation with the bores 38, 39, 40, 33, and 34, and of reducing the amount of eddy current losses by interrupting the eddy current paths in the core.

It will be noted that the core 31 is made from a piece of soft iron stock which is square in cross section as seen in Figs. 5 and 6. Throughout most of the length of the core 31 the corners are rounded off as at 43, but at the lower portion of the core they are not so rounded off and form flaring portions 44. Located in the solenoid supporting member 16 is a centering washer or spring 45 which is held in place by means of the spring ring 47 expanded in a groove in the supporting member 16. The centering washer or spring 45 has openings 49 therein as shown in Fig. 2 to give the proper resiliency to the washer and to allow passage of fluid from the valve member into the tube 22. The centering washer 45 coacts with the flared portions 44 to center the lower end of the core and to prevent sticking of the core in its upper position, as will be more clearly pointed out hereafter.

The operation of the device is as follows: assuming that the parts are as shown in Fig. 1, the core and valve are held downwardly by gravity, and the core 31 is free to move laterally in the tube 22. Fluid from the valve 10 is allowed to circulate freely between the coil 18 and core 31. Alternating current is then applied to coil 18 which pulls the core 31 upwardly. The valve stem 32 will not move immediately because of the lost motion. After the core 31 has gained momentum the lost motion will be taken up and the valve 32 will be quickly pulled from its seat 14. In effect, there is a hammer action pulling the valve from its seat which prevents sticking of the valve and aids in opening the valve against high pressures.

As the core or plunger approaches its upper limit of movement it is guided to its center position by the coaction of the hollowed portion 38 in the core or plunger and the tapered projection 38' of the non-magnetic conducting plug member 23. At its upper limit of movement the tapered bore 39 of the core engages the tapered projection 39' of the magnetic stop pin 25 thereby absolutely centering the upper portion of the core or plunger in the tube 22 and preventing lateral displacement of the core. When the core reaches this extreme upward position the hollowed portion 38 does not contact the projection 38' of the non-magnetic member 23, a slight clearance being provided between these members.

The non-magnetic conducting plug 23 forms a shading coil around the magnetic stop pin 25 and causes a magnetic flux to pass through the magnetic stop pin 25, which flux lags behind the main flux by approximately 90°. The circuit for the main flux is completed through the core 31, the upper plate 17, the casing 21, the lower plate 17, and the core 31, while the circuit for the shaded flux is completed through the core 31, stop pin 25, the air gap between the stop pin 25 and the disc 17, the disc 17, the casing 21, the lower plate 17, and the core 31. The out of phase division of flux on the upper end of the core 31 causes a more or less constant magnetic holding force acting on core 31 tending to hold it tightly against the stop pin 25 because the zero points of the two fluxes do not coincide.

In constructions that do not employ this shading coil, the plunger or core cannot be successfully held against a positive stop because of the sinoidal nature of A. C. current wherein the holding force varies from a maximum to zero during each half-cycle. When the holding force reaches zero the plunger or core tends to fall away from the stop thereby creating vibrations and serious hums.

By using the shading coil of this invention as set out above, a separate current is set up that is out of phase with the power current so that when the holding force of the main flux is at zero, the holding force of the shaded flux is at a maximum or nearly so, and vice versa, whereby a substantially constant holding force is applied to the core or plunger 31 to prevent the dropping away of the core or plunger 31 from the positive stop 25.

The hollowed portion 38 and the projection 38' which guide the plunger or core 31 in its upward movement insure that the surfaces 39 of the core and 39' of stop pin will completely engage and prevent a partial engagement of these members which would be detrimental to the proper and efficient operation of the device.

From this construction it is seen that the core or plunger is held with a substantially constant force against a positive stop at its upper end by means of the shading coil construction, and that it is centered and prevented from moving laterally by the tapered construction 39, 39'.

The lower part of the core is centered by means of the centering washer 45 and its coaction with the flaring portions 44 of the core when the core is in its upper position, as shown in Fig. 6. The flaring portions 44 are so constructed that when the core is in its upper position the centering washer is flexed upwardly a slight amount so as to put a tension in the centering washer. This tension creates a downward force on the plunger about twice that of gravity but not sufficient to overcome the upward holding force so that when the coil 18 is deenergized the centering washer will give an additional downward force to the core 31. This is helpful in case the tapered counter-bore 39 of the core 31 should stick to the tapered projection 39' of the stop pin 25 or if there be residual magnetism present in the core 31. From this it will be seen that the centering washer 45 has a dual function—that of centering the lower end of the core 31, and of creating a downward force on the core to prevent sticking of the core in its upper position when the coil 18 is deenergized.

When the coil is deenergized, centering washer 45 starts the core 31 on its downward movement. The downward movement is then completed by gravity. As the core and valve move downwardly the valve will seat; then the lost motion will be taken up and the core 31 will give the valve a hammer-like blow as it engages the collar 35 to insure a tight seat.

From the above description and illustration it will be seen that I have devised a valve that is operated by an A. C. solenoid wherein sticking of the valve is prevented and valve seat tightness is insured by means of a hammer action; that the coil and core are cooled by reason of the fluid's being allowed to circulate between the coil and core; that vibrations and hums in the A. C. solenoid are prevented by centering and tightly holding with a substantially constant force the core rigidly when the coil is energized; and that the core which acts against a positive stop when the coil is energized is prevented from sticking in its upper position when the coil is deenergized.

The various details of my invention may be modified without departing from the principle of the invention which is not limited to the particular embodiment illustrated and described hereinbefore, but includes such modifications thereof as shown within the scope of the appended claims.

I claim:

1. In a device of the class described, an electromagnet embodying a coil, a core loosely mounted in said coil, and means for centering said core in said coil when said coil is energized including a stationary disc member having a hole therein through which normally said core loosely extends and a flared portion on said core to engage said disc member.

2. In a device of the class described, an electromagnet embodying a coil, a core loosely mounted in said coil, and means for centering said core in said coil when said coil is energized including a spring disc member having an opening therein through which normally said core loosely extends and a flared portion on said core to engage said spring disc member.

3. In an electromagnet of the class described having a coil and a core loosely mounted therein, spring means associated with said core to center said core when said coil is energized to move said core in one direction and to move said core in the other direction when said coil is deenergized, said spring means being substantially yieldable only in a direction longitudinal of the core so as to prevent transverse movement of the core when said coil is energized.

4. In a device of the class described, an electromagnet embodying a coil, an elongated core vertically arranged and loosely mounted in said coil, said core adapted to be raised when the coil is energized and lowered by gravity when said coil is deenergized, means acting on one end of said core to center and hold with a substantially constant force said core when said coil is energized and means acting on the other end of said core to center said core and to create a force counter to the substantially constant holding force of said first means whereby movement of said core is assured when said coil is deenergized.

5. In a device of the class described, an electromagnet embodying a coil, an elongated core vertically arranged and loosely mounted in said coil, said core adapted to be raised when the coil is energized and lowered by gravity when said coil is deenergized, means acting on one end of said core to center and hold with a substantially constant force said core when said coil is energized and means acting on the other end of said core to center said core and to create a force counter to the substantially constant holding force of said first means whereby movement of said core is assured when said coil is deenergized, said first-mentioned means including a non-magnetic conducting member, and a magnetic member extending therethrough to be engaged by said core.

6. In a device of the class described, an electromagnet embodying a coil, an elongated core vertically arranged and loosely mounted in said coil, said core adapted to be raised when the coil is energized and lowered by gravity when said coil is deenergized, means acting on one end of said core to center and hold with a substantially constant force said core when said coil is energized and means acting on the other end of said core to center said core and to create a force counter to the substantially constant holding force of said first means whereby movement of said core is assured when said coil is deenergized, said first-mentioned means including a non-magnetic conducting member and a magnetic member projecting therethrough, said core having a bore to receive said magnetic member.

7. In a device of the class described, an electromagnet embodying a coil, an elongated core vertically arranged and loosely mounted in said coil, said core adapted to be raised when the coil is energized and lowered by gravity when said coil is deenergized, means acting on one end of said core to center and hold with a substantially constant force said core when said coil is energized and means acting on the other end of said core to center said core and to create a force counter to the substantially constant holding force of said first means whereby movement of said core is assured when said coil is deenergized, said first-mentioned means including a non-magnetic conducting member secured to said coil, and a magnetic member extending therethrough and having a tapered portion, said core having a tapered bore to receive and engage said tapered portion.

8. In a device of the class described, an electromagnet embodying a coil, an elongated core vertically arranged and loosely mounted in said coil, said core adapted to be raised when the coil is energized and lowered by gravity when said coil is deenergized, means acting on one end of said core to center and hold with a substantially constant force said core when said coil is energized and means acting on the other end of said core to center said core and to create a force counter to the substantially constant holding force of said first means whereby movement of said core is assured when said coil is deenergized, said second-mentioned means including a stationary member and a flared portion on said core to engage said member.

9. In a device of the class described, an electromagnet embodying a coil, an elongated core vertically arranged and loosely mounted in said coil, said core adapted to be raised when the coil is energized and lowered by gravity when said coil is deenergized, means acting on one end of said core to center and hold with a substantially constant force said core when said coil is energized and means acting on the other end of said core to center said core and to create a force counter to the substantially constant holding force of said first means whereby movement of said core is assured when said coil is deenergized, said second-mentioned means including a stationary disc member having a hole therein through which normally said core loosely extends and a flared portion on said core to engage said disc member.

10. In a device of the class described, an electromagnet embodying a coil, an elongated core vertically arranged and loosely mounted in said coil, said core adapted to be raised when the coil is energized and lowered by gravity when said coil is deenergized, means acting on one end of said core to center and hold with a substantially constant force said core when said coil is energized and means acting on the other end of said core to center said core and to create a force counter to the substantially constant holding force of said first means whereby movement of said core is assured when said coil is deenergized, said second-mentioned means including a spring disc member having an opening therein through which normally said core loosely extends and a flared portion on said core to engage said spring disc member.

11. In an A. C. solenoid having a coil and plunger loosely mounted therein, a combined stop and shading coil for centering and securely holding said plunger with a substantially constant force when said first coil is energized comprising a non-magnetic conducting member with a tapered projection carried by said first coil, and a magnetic stop pin secured to and extending through said non-magnetic conducting member and having a tapered projection thereon, said plunger having two adjacent tapered bores, the first of which coacts with the first-mentioned tapered projection to guide the plunger, and the second of which engages with the second-mentioned tapered projection to form the stop and complete the shading circuit.

12. The combination with a valve of an electromagnet mounted on the valve and adapted to open and close the same, said electromagnet comprising a coil having a passage connected to the valve and a core loosely mounted in the passage to permit circulation of fluid between the coil and core to absorb and carry away heat generated in the electromagnet, and means in the passage for centering the core in the coil when the coil is energized including a stationary member and a flared portion on said core to engage said member, said member having an opening to permit fluid to enter said passage from said valve.

13. The combination with a valve of an electromagnet mounted on the valve and adapted to open and close the same, said electromagnet comprising a coil having a passage connected to the valve and a core loosely mounted in the passage to permit circulation of fluid between the coil and core to absorb and carry away heat generated in the electromagnet, and means in one end of the passage for centering the core in the coil when the coil is energized including a stationary member and a flared portion on said core to engage said member, said member having an opening to permit fluid to enter the passage from said valve, and means in the other end of the passage for sealing said passage and for centering and holding the core in the passage when the coil is energized.

14. In a device of the class described, an electromagnet embodying a coil and a core loosely mounted in said coil, said core being provided with a tapered surface adjacent one extremity thereof, a core guide of non-magnetic conducting material having a tapered guiding surface corresponding to said tapered surface of the core and being secured to said coil, and a magnetic member extending through said guide and engaging the end of said core to constitute a stop and holding member therefor.

15. In a device of the class described, an electromagnet embodying a coil and a core loosely mounted in said coil, said core being provided with a tapered surface adjacent one extremity thereof, a core guide of non-magnetic conducting material having a tapered guiding surface corresponding to said tapered surface of the core and being secured to said coil, and a magnetic member extending through said guide and engaging the end of said core to constitute a stop and holding member therefor, said magnetic member being disposed relative to said core guide so as to stop the movement of said core before the same has moved sufficiently to cause engagement of the tapered surfaces of said core and core guide.

16. In a device of the class described, an electromagnetic coil having a passage extending therethrough, a sleeve of non-magnetic material within said passage, a core of magnetic material loosely mounted in said coil within said sleeve, and means for centering and tightly holding said core in said coil when said coil is energized including a non-magnetic conducting member directly secured to said sleeve and a magnetic member extending therethrough to be engaged by said core.

17. In a device of the class described, an electromagnetic coil having a passage extending therethrough, a sleeve of non-magnetic material within said passage, a core of magnetic material loosely mounted in said coil within said sleeve, a casing for said device, and means for centering and tightly holding said core in said coil when said coil is energized including a non-magnetic conducting member directly secured in said sleeve and a magnetic member secured to said casing and extending through said sleeve to be engaged by said core.

18. In combination, an electromagnetic coil having a passage extending therethrough, a casing of magnetic material surrounding said coil, plates of magnetic material on opposite ends of said coil, a core of magnetic material loosely mounted in said coil and adapted upon energization of the coil to move in a direction tending to reduce the reluctance of a magnetic path including said core, said casing, and said end plates, a stop for limiting movement of and guiding said core, said stop comprising a sleeve of non-magnetic material secured with respect to said coil and a magnetic member extending through said sleeve and adapted to be engaged at one end by said core, said magnetic member terminating at its other end at a point spaced by an air gap from one of said end plates, so as to furnish a parallel flux path through said magnetic member subject to the shading action of said sleeve of non-magnetic material.

19. In combination, an electromagnetic coil having a passage extending therethrough, a sleeve of non-magnetic material extending through said passage, a casing of magnetic material surrounding said coil, plates of magnetic material on opposite ends of said coil, a core of magnetic material loosely mounted in said coil within said sleeve and adapted upon energization of the coil to move in a direction tending to reduce the reluctance of a magnetic path including said core, said casing, and said end plates, a stop for limiting movement of and guiding said core, said stop comprising a sleeve of non-magnetic material secured inside said sleeve, and a magnetic member extending through said sleeve and adapted to be engaged at one end by said core, said magnetic member terminating at its other end at a point spaced by an air gap from one of said end plates, so as to furnish a parallel flux path through said magnetic member subject to the shading action of said sleeve of non-magnetic material.

20. The combination with a device to be actuated of an electromagnet associated with said device and adapted to actuate the same, said electromagnet embodying a coil, an elongated core loosely mounted in said coil and means independent of said device to be actuated acting on both ends of said core for simultaneously centering said core in said coil when said coil is energized, said centering means being so effective only when said core is in its energized position so as not to impede movement of said core to said position.

21. The combination with a device to be actuated of an electromagnet associated with said device and adapted to actuate the same, said electromagnet embodying a coil, an elongated core vertically arranged and loosely mounted in said coil, said core adapted to be moved to one position when said coil is energized and to another position when said coil is deenergized, means acting on one end of said core to center and tightly hold said core, and means acting on the other end of said core to center said core, both of said means being operative only when said coil is energized and both being independent of the device actuated.

22. In a device of the class described, an electromagnet embodying a coil, a core loosely mounted in said coil, and means for centering said core in said coil including a disc member having a hole therein through which a portion of said core extends, said centering means being effective when said core is in its energized position to exert a force thereon tending to move said core to its deenergized position, said centering means being ineffective to center said core until said core is in substantially said energized position.

23. In a solenoid operated mechanism, a winding having a passage therethrough, a core extending through and loosely mounted in said coil, a member to be operated having a portion extending at least partially through said core lengthwise thereof and relatively movable with respect thereto, a projection on said member adapted to engage a portion of said core to limit the movement of said core relative to said member, a plug member located in and acting as a closure at one end of said core passage, a base member upon which said winding rests, a casing surrounding said winding and said plug member, means associated with said plug member for clamping said casing in position with respect to said base member, and resilient means interposed between said casing and said winding whereby said winding is yieldably urged against said base member.

WILLIS H. GILLE.